(12) United States Patent
Wood et al.

(10) Patent No.: US 9,111,305 B2
(45) Date of Patent: Aug. 18, 2015

(54) PERSONAL REMOTE STORAGE FOR PURCHASED ELECTRONIC CONTENT ITEMS

(75) Inventors: James H. Wood, Seattle, WA (US);
Korwin J. Smith, Seattle, WA (US);
Christopher G. Emery, Seattle, WA (US); Wenlin Ma, Seattle, WA (US);
Lucas B. Dickey, Seattle, WA (US);
Piragash Velummylum, Seattle, WA (US); Johanna S. Olson, Bellevue, WA (US); William D. Carr, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 678 days.

(21) Appl. No.: 12/972,267

(22) Filed: Dec. 17, 2010

(65) Prior Publication Data

US 2012/0158547 A1    Jun. 21, 2012

(51) Int. Cl.
| | | |
|---|---|---|
| *G06Q 99/00* | (2006.01) | |
| *G06Q 30/06* | (2012.01) | |
| *H04N 21/2543* | (2011.01) | |
| *H04N 21/2743* | (2011.01) | |
| *H04N 21/472* | (2011.01) | |
| *G06Q 50/00* | (2012.01) | |
| *G06Q 20/12* | (2012.01) | |

(52) U.S. Cl.
CPC ........ *G06Q 30/0601* (2013.01); *G06Q 30/0641* (2013.01); *H04N 21/2543* (2013.01); *H04N 21/2743* (2013.01); *H04N 21/47211* (2013.01); *G06Q 20/123* (2013.01); *G06Q 50/00* (2013.01); *G06Q 2220/10* (2013.01)

(58) Field of Classification Search
CPC .. G06Q 20/123; G06Q 2220/10; G06Q 50/00
USPC ................................................ 705/51; 726/1
See application file for complete search history.

(56) References Cited

U.S. PATENT DOCUMENTS

| | | | |
|---|---|---|---|
| 5,907,845 A |  | 5/1999 | Cox et al. |
| 5,978,815 A | * | 11/1999 | Cabrera et al. ........................ 1/1 |
| 7,437,310 B1 |  | 10/2008 | Dutta |
| 7,657,885 B2 | * | 2/2010 | Anderson ..................... 717/170 |
| 8,001,087 B1 | * | 8/2011 | Newstadt et al. .............. 707/665 |
| 2005/0235282 A1 | * | 10/2005 | Anderson ..................... 717/178 |
| 2006/0212698 A1 |  | 9/2006 | Peckover |
| 2007/0094702 A1 |  | 4/2007 | Khare et al. |
| 2008/0082905 A1 | * | 4/2008 | Martinez et al. .............. 715/205 |
| 2008/0168133 A1 | * | 7/2008 | Osborne ....................... 709/203 |

(Continued)

OTHER PUBLICATIONS

The PCT Search Report mailed Apr. 13, 2012 for PCT application No. PCT/US11/64932, 8 pages.

*Primary Examiner* — James D Nigh
(74) *Attorney, Agent, or Firm* — Lee & Hayes, PLLC

(57) ABSTRACT

Architectures and techniques are described to provide personal remote storage space for electronic content items acquired (e.g., purchased) by a user of a client device. In some cases, as part of a transaction to acquire the electronic content item, an individual may receive an option that is selectable to indicate a preference to send electronic content items acquired by the individual to a personal remote storage space of the individual. When the option to store the electronic content item in the personal remote storage space is not selected by the individual, the electronic content item may be provided directly to a designated computing device of the individual.

22 Claims, 10 Drawing Sheets

(56) References Cited

U.S. PATENT DOCUMENTS

2010/0031310 A1* 2/2010 Konetski et al. .................. 726/1
2010/0248699 A1 9/2010 Dumais
2011/0022642 A1* 1/2011 deMilo et al. ................. 707/805

* cited by examiner

PERSONAL REMOTE STORAGE FOR PURCHASED ELECTRONIC CONTENT ITEMS

BACKGROUND

Individuals frequently acquire electronic content items from sites via computing devices. For example, individuals may acquire music content items from a site of a merchant. The electronic content items acquired by a particular individual are usually sent to the computing device that is utilized to acquire the electronic content items. To illustrate, upon acquiring a track from a site of a merchant, the computing device utilized to acquire the track may download the track from a server of the merchant or from another source.

However, in many cases, transfer of the track to other computing devices is restricted. For example, digital rights associated with the track may prohibit or strictly control the transfer of the track to another computing device. In other cases, the track may only be accessible to the computing device that downloaded the track or to another computing device that is linked to the computing device, such as via a local area network or a wireless local area network. Thus, access to the track by multiple computing devices of an individual is limited.

In addition, due to memory capacity limitations of many portable computing devices, an individual may be unable to store all of the files and electronic content items that the individual may desire to access in the portable computing device. Accordingly, an individual may need to spend a large amount of time syncing the content of one computing device with the content of another computing device and/or adding and removing files to fit the individual's interests and needs at any particular time. Thus, managing the individual's electronic content items and other files may become inconvenient and frustrating.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes architectures and techniques to provide electronic content items to a personal remote storage space of an individual in response to acquiring the electronic content item from a content provider. In particular, an individual may receive an option that is selectable to indicate a preference to send electronic content items acquired by the individual to personal remote storage. In some cases, the option may be provided during a transaction to purchase the electronic content item. To illustrate, when confirming the purchase of the electronic content item, a user interface may be served to the individual that includes an option to store the electronic content item in a personal remote storage space. Upon selection of the option, the electronic content item is sent to a personal remote storage space of the individual. In some cases, selection of the option may result in a default preference being set to have each subsequent electronic content item purchased through a particular content provider stored in the personal remote storage space of the individual. When the option is not selected by the individual, the electronic content item may be provided directly to a designated computing device.

When an electronic content item is saved in the personal remote storage space of an individual, the electronic content item can be accessed by the individual from any location where access to the personal remote storage space is available. Additionally, the individual can access the electronic content item via a number of computing devices that can communicate with a remote storage server that manages personal remote storage spaces. Further, storage space of computing devices of the individual is preserved because electronic content items and other files can be stored in the personal remote storage space, while remaining accessible by the computing devices. In this way, the individual's experience with respect to obtaining, storing, managing and accessing electronic content items is simplified and improved because the electronic content items of the individual are stored in a single location that is accessible by any number of computing devices from any location that provides network access to the individual's personal remote storage space.

Example Architectures

Figure 1:
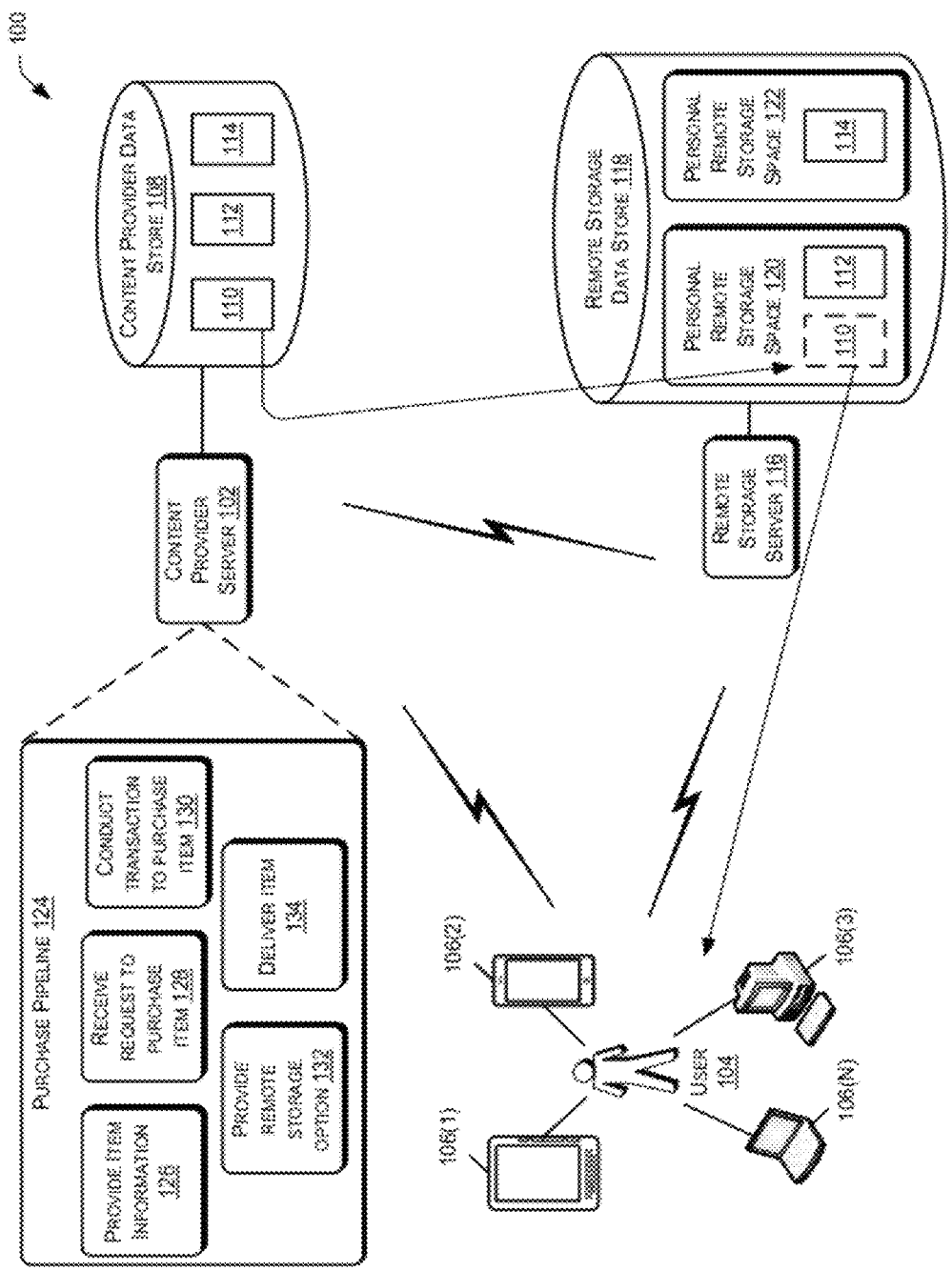
FIG. 1 illustrates an architecture to provide personal remote storage of electronic content items acquired by a user of a client device.

FIG. 1 illustrates an architecture to provide personal remote storage of electronic content items acquired by a user of a client device. The architecture 100 includes a content provider 102 that provides electronic content items to a user via one or more client device 106(1)-106(N). For example, the content provider 102 may send an electronic content item to one or more of the client devices 106 in response to a request for the electronic content item from a particular client device 106. The client devices 106 may include a laptop computer, a desktop computer, a smart phone, a mobile handset, a personal digital assistant (PDA), a portable navigation device, a portable gaming device, a tablet computer, a watch, a portable media player, another computing device, and the like.

The content provider 102 may be coupled to a content provider data store 108. The content provider data store 108 may include network-based storage, such as cloud storage, and/or non-network-based storage. The content provider data store 108 stores a number of electronic content items, such as the electronic content items 110-114, that may be provided to users, such as the user 104, by the content provider 102.

In a particular implementation, the content provider 102 and/or the client device 106 may be in communication with a remote storage server 116. The remote storage server 116 may be coupled to a remote storage data store 118 that includes a number of personal remote storage spaces, such as personal remote storage spaces 120 and 122. The personal remote storage spaces 120 and 122 may store electronic content items and other files, such as the electronic content items 112 and 114. The remote storage server 116 may manage access to the electronic content items stored in the personal remote storage spaces 120, 122. The remote storage data store 118 may include network-based storage, such as cloud storage, and/or non-network-based storage.

In an illustrative implementation, the content provider 102 may utilize a purchase pipeline 124 to provide electronic content items to individuals, such as the user 104. For example, at 126, the purchase pipeline 124 includes providing item information to the user 104. The item information may include information about a particular electronic content item, such as a title of the electronic content item, price of the electronic content item, a description of the electronic content item, information about a creator of the electronic content item (e.g. an artist that created audio or video content), reviews of the electronic content item, availability of the electronic content item, and so on. The item information may be provided to the user 104 as a detail page of the particular electronic content item.

At 128, the purchase pipeline 124 includes the content provider server 102 receiving a request to purchase an electronic content item, such as the electronic content item 110. For example, the user 104 may view a page via the client device 106 provided by the content provider server 102, where the page includes item information corresponding to the electronic content item 110. In addition, the page may include one or more options that are available to purchase the electronic content item 110. To illustrate, a detail page provided by the content provider server 102 to the client device 106 may include a "checkout" or "add to cart" option that is selectable to initiate a transaction to purchase the electronic content item 110. In other cases, the detail page may include an option to enter a phrase or identifier of the user 104 that is linked to an account of the user 104 that can be utilized to purchase the electronic content item 110.

At 130 of the purchase pipeline 124, the content provider server 102 may conduct a transaction to purchase the electronic content item 110 and confirm purchase of the electronic content item 110. In a particular implementation, the content provider server 102 may communicate with a bank, a credit card company, or one or more additional financial institutions to confirm that the user has funds available to purchase the electronic content item 110 and to transfer the necessary funds to the content provider. In some cases, the content provider server 102 may also serve a page to the client device 106 indicating confirmation of the purchase of the electronic content item 110 by the user 104, such as a Thank You page or a Confirmation page.

At 132, the content provider server 102 may provide a remote storage option to the user 104 via the client device 106. For example, a Thank You page served to the client device 106 confirming purchase of the electronic content item 110 may also include an option to send the electronic content item 110 to a personal remote storage space. For example, the user 104 may be associated with the personal remote storage space 120 and the content provider server 102 may provide an option for the user 104 to store the electronic content item 110 in the personal remote storage space 120. In some cases, the personal remote storage space 120 may have been created before providing the option to provide remote storage of the electronic content item at 132. In particular, the user 104 may have requested that the content provider server 102 allocate personal remote storage space when previously conducting a purchase of another electronic content item, such as the electronic content item 112. In other cases, the content provider server 102 may request that the remote storage server 116 set aside the personal remote storage space 120 for the user 104 during the transaction to purchase the electronic content item 110. In particular, the personal remote storage space 120 may be set aside in response to the content provider server 102 receiving an indication that the user 104 has selected the option to provide remote storage for the electronic content item 110.

At 134, the electronic content item 110 is delivered to one or more storage locations. For example, when the option to store the electronic content item 110 remotely is selected by the user 104, the content provider server 102 may send the electronic content item to the remote storage server 116 for storage in the personal remote storage space 120. In another example, when the option to store the electronic content item 110 remotely is not selected, the content provider server 104 may send the electronic content item 110 directly to one or more of the client devices 106. Further, the content provider server 102 may send the electronic content item 110 to both the client device 106 and the remote storage server 116. The electronic content item 110 may also be sent to the personal remote storage space 120 and/or one or more of the client devices 106 based on preferences set by the user 104 that specify delivery options for electronic content items purchased by the user 104.

Once the electronic content item 110 has been delivered to the user 104, the user 104 may access the electronic content item 110 via one or more of the client devices 106. In an illustrative implementation, the user 104 may utilize a media player application of one of the client devices 106 to access and consume a copy of the electronic content item 110 stored locally in the client device 106. In another implementation, the user 104 may utilize a network-based media service to stream the electronic content item 110 to the client device 106 from the personal remote storage space 120. The electronic content item 110 may also be accessed directly by the client device 106 via the remote storage server 116. In some cases, the user 104 can download a copy of the electronic content item 110 from the personal remote storage space 120 utilizing any of the client devices 106. Further, the user 104 can stream the electronic content item 110 from the personal remote storage space 120 via the client devices 106.

By storing purchased electronic content items in personal remote storage space of a user, memory space of one or more client devices of the user may be preserved. Additionally, the electronic content items stored in the personal remote storage space of the user may be accessed from a number of client devices associated with the particular user. Further, storing electronic content items in a personal remote storage space may aid in maintaining an untainted or original version of electronic content items in case of tampering, improper modification, and/or inadvertent deletion of electronic content items stored on a client device of an individual.

Example System

Figure 2:
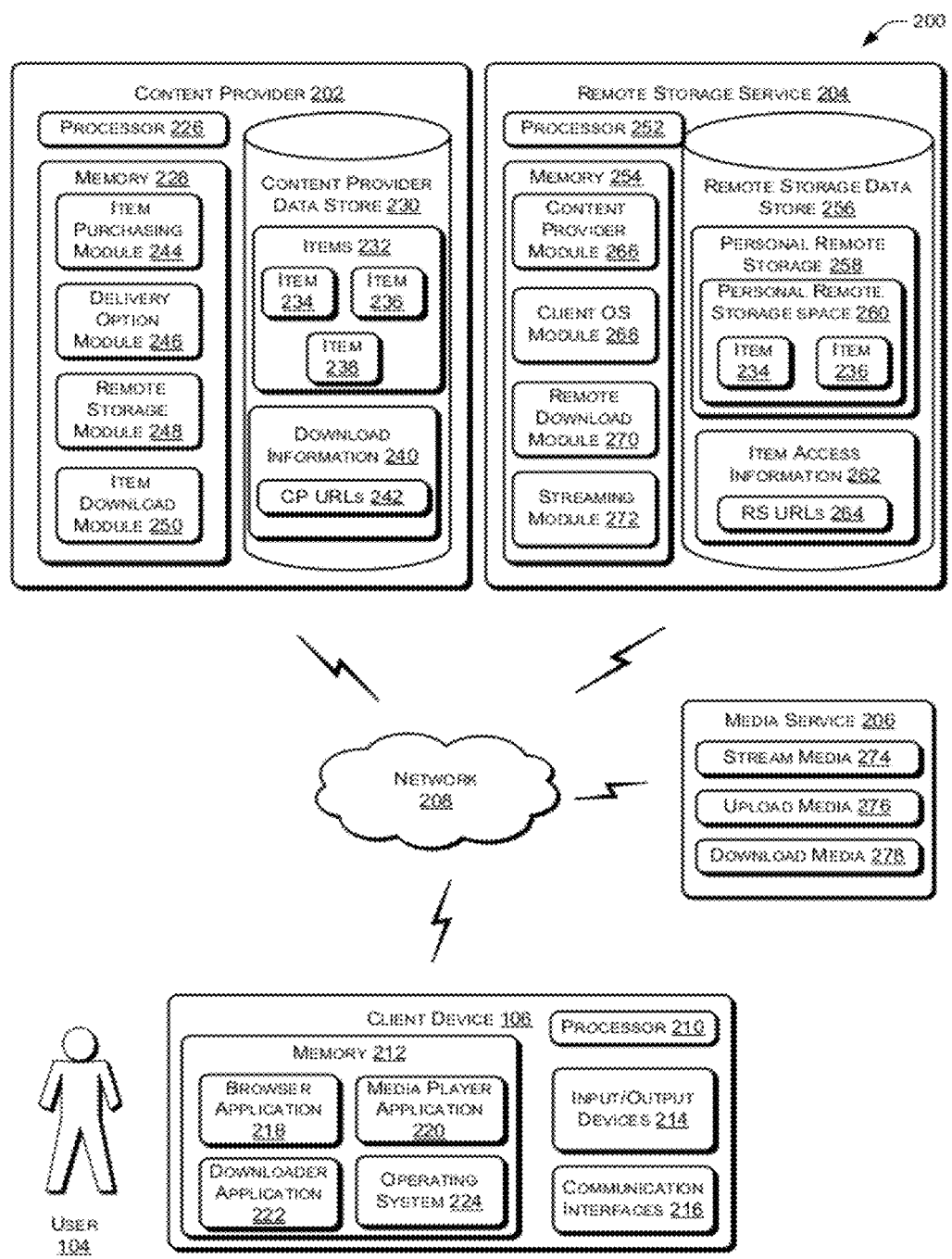
FIG. 2 illustrates components of a system to provide personal remote storage of electronic content items acquired by a user of a client device.

FIG. 2 illustrates components of a system 200 to provide personal remote storage of electronic content items purchased by a user of a client device. The system 200 includes a content provider 202 to provide electronic content items to users via respective client devices, such as the user 104 and the client device 106. The system 200 also includes a remote storage service 204 to provide personal remote storage space for electronic content items provided by the content provider 202 to client device users. Further, the system 200 includes a media service 206 to provide access to electronic content items provided by the content provider 202, such as electronic content items stored by the remote storage service 204. The content provider 202, the remote storage service 206, and/or the media service 206 may comprise a single server, a cluster of servers, a server farm or data center, and so forth, although other server architectures (e.g., a mainframe architecture) may also be used. In a particular example, the content provider 202, the remote storage service 204, and the media service 206 may be part of an online merchant that provides electronic content items to customers.

Additionally, the system 200 includes a network 208 that facilitates communication between components of the system 200, such as the components 202, 204, 206, and 106. The network 208 may be representative of any one or combination of multiple different types of wired and wireless networks, such as the Internet, cable networks, satellite networks, wide area wireless communication networks, wireless local area networks, and public switched telephone networks (PSTN).

The client device 106 includes one or more processors indicated by the processor 210. The client device 106 also includes memory 212 that is accessible by the processor 210. The memory 212 is an example of computer readable storage media and may include volatile memory, nonvolatile memory, removable memory, non-removable memory, or a combination thereof. For example, the memory 212 may include, but is not limited to, RAM, ROM, EEPROM, flash memory, one or more hard disks, solid state drives, optical memory (e.g. CD, DVD), or other non-transient memory technologies. The memory 212 may store a number of modules including computer-readable instructions executable by the processor 210 to obtain and consume electronic content items.

In addition, the client device 106 includes input/output devices 214 that may be utilized by the user 104 to input data, such as a keyboard, a pointer device (e.g. mouse), a touch screen, a touch pad, a microphone, etc., and to output information, such as a display, speakers, and so on. Further the client device 106 includes communication interfaces 216, such as one or more wired and/or wireless communication interfaces that facilitate communication via one or more wireline networks, one or more wireless networks, or a combination thereof.

The memory 212 of the client device 106 includes a browser application 218 or one or more other suitable applications that are executable by the processor 210 to obtain and render content provided by one or more sites or one or more other content sources that are accessible via the network 208. For example, the browser application 218 may be executable by the processor 210 to obtain information about electronic content items provided by the content provider 202. To illustrate, the browser application 218 may be executable by the processor 210 to obtain a detail page about a particular electronic content item offered by the content provider 202. The browser application 218 may be utilized to provide one or more pages of a site of the content provider 202 that correspond to conducting a transaction to acquire a particular electronic content item.

Additionally, the memory 212 includes a media player application 220 that is executable by the processor 210 to consume electronic content items. In some cases, the media player application 220 may be utilized to listen to audio content stored at the client device 106. In other cases, the media player application 220 may be utilized to view image and/or video content stored at the client device 106. At least some of the electronic content items consumed via the media player application 220 may be obtained from the content provider 202 and/or the remote storage service 204.

Further, the memory 212 includes a downloader application 222 that is executable by the processor 210 to download electronic content items from the content provider 202, the remote storage service 204, or a combination thereof. In addition, the downloader application 222 may also insert downloaded electronic content items into the media player application 220 to enable consumption of electronic content items downloaded from the content provider 202 and/or the remote storage service 204 via the media player application 220. To illustrate, when electronic content items are downloaded from the content provider 202 and/or the remote storage service 204, the downloader application 222 may communicate with the media player application 220 such that the electronic content items are viewable in one or more playlists shown via the media player application 220. In some scenarios, the downloader application 222 may be obtained from the content provider 202, the remote storage service 204, the media service 206, or another source upon request from the client device 106.

The memory 212 also stores an operating system 224 that is executable by the processor 210 to manage hardware devices of the client device 106 and/or software applications executing on the client device 106. The operating system 224 may also handle requests for information about components of the client device 106 from the content provider 202, the remote storage service 204, and the media service 206. In particular, the operating system 224 may provide communications to the content provider 202, the remote storage service 204, and/or the media service 206 indicating that the downloader application 222 is executing on the client device 106.

The content provider 202 includes one or more processors indicated by the processor 226. The content provider 202 also includes memory 228 that is accessible by the processor 226. The memory 228 is an example of computer readable storage media and may include volatile memory, nonvolatile memory, removable memory, non-removable memory, or a combination thereof. For example, the memory 228 may include, but is not limited to, RAM, ROM, EEPROM, flash memory, one or more hard disks, solid state drives, optical memory (e.g. CD, DVD), or other non-transient memory technologies. The memory 228 may store a number of modules including computer-readable instructions executable by the processor 226 to provide electronic content items to users.

The content provider 202 also includes a content provider data store 230 that stores a number of electronic content items 232, such as the electronic content items 234-238, that may be provided to client devices in communication with the content provider 202. The electronic content items 234-238 may include audio content, video content, image content, software, gaming content, other content, or a combination thereof. For example, the electronic content items 234-238 may include one or more music albums, one or more tracks of an album, one or more songs, other audio content, one or more television show episodes, one or more movies, other video content, one or more pictures, one or more instances of a software application, one or more instances of an electronic game, or a combination thereof.

The content provider data store 230 also includes download information 240. The download information 240 may be provided to client devices, such as the client device 106, to facilitate downloading electronic content items 232 from the content provider 202. In particular, the download information 240 may include identifiers specifying a storage location of each of the electronic content items 232, such as content provider uniform resource locators (URLs) 242.

The memory 228 of the content provider 202 includes an item purchasing module 244 that is executable by the processor 226 to provide information regarding the electronic content items 232 to client devices, such as the client device 106. In particular, the item purchasing module 244 may provide pricing information, availability information, descriptions, reviews, recommendations, and so forth corresponding to each of the electronic content items 232 to client devices. For example, the item purchasing module 244 may serve a detail page of the electronic content item 234 to the client device 106 in response to a request from the client device 106 for information regarding the electronic content item 234.

The item purchasing module 244 may also conduct financial transactions relating to the purchase of the electronic content items 232. To illustrate, the item purchasing module 244 may receive a request from the client device 106 to purchase the electronic content item 234. In response, the item purchasing module 244 may access financial information of the user 106 from an account of the user 104 with the content provider 202 and/or from financial institutions associated with the user 104. For example, if the user 104 has designated a particular credit card number in relation to the purchase of the electronic content item 234, the item purchasing module 244 may communicate with the corresponding credit card company to conduct a transaction for the purchase of the electronic content item 234 by the user 104. Once the transaction to purchase the electronic content item 234 is complete, the item purchasing module 244 may provide confirmation of the purchase to the client device 106. In some cases, the item purchasing module 244 may serve a Confirmation page or a Thank You page to the client device 106 indicating that the electronic content item 234 has been purchased by the user 104.

The memory 226 also includes a delivery option module 246 that is executable by the processor 226 to determine means by which to deliver electronic content items 232 that have been purchased by client device users. In some cases, the delivery option module 246 may access settings of an account of a client device user to determine delivery option preferences. In particular, the account settings of a client device user may indicate that electronic content items 232 obtained from the content provider 202 are to be sent to a personal remote storage space of the client device user and/or downloaded directly to the client device of the user.

In other cases, the delivery option module 246 may provide delivery options to a client device user during a transaction to purchase a particular electronic content item, such as the electronic content item 234. For example, the delivery option module 246 may communicate with the item purchasing module 244 to provide electronic content item delivery options via a Confirmation page or a Thank You page served in response to the purchase of the electronic content item 234 by the user 104. To illustrate, the Confirmation page or the Thank You page may include a delivery option that is selectable to store the electronic content item 234 in a personal remote storage space of the user 104 at the remote storage service 204, an option to download the electronic content item 234 to the client device 106, or a combination thereof.

In some situations, the delivery option module 246 may provide a number of delivery options to the user 104 for each purchase of an electronic content item 232 from the content provider 202 without setting a default preference. In other situations, selection of a particular delivery option may set a default preference of the user 104. In particular, selection of a delivery option to store the electronic content item 234 in a personal remote storage space may set a delivery preference of the user 104 to store all electronic content items obtained by the user 104 from the content provider 202 in the personal remote storage space of the user 104. Additionally, selection of a delivery option to download the electronic content item 234 to the client device 106 may set a default preference of the user 104 to download all electronic content items obtained from the content provider 202 to the client device 106. Further, the delivery option default preference of the user 104 may be set when the user 104 configures or adjusts account settings of the user 104.

The memory 228 includes a remote storage module 248 that is executable by the processor 226 to provide electronic content items 232 purchased by a particular client device user to personal remote storage space of the particular client device user. In an illustrative implementation, upon determining that the user 104 has purchased the electronic content item 234 and determining that the electronic content item 234 is to be delivered to a remote personal storage space of the user 104, the remote storage module 248 may send the electronic content item 234 or a copy of the electronic content item 234 to the remote storage service 204. When sending the electronic content item 234 to the remote storage service 204, the remote storage module 248 may specify that the electronic content item 234 is to be stored in conjunction with the personal remote storage space of the user 104. For example, the remote storage module 248 may send an identifier of the personal remote storage space of the user 104 along with the electronic content item 234.

In some instances, the remote storage module 248 may merely send an indication to the remote storage service 204 that the electronic content item 234 is to be stored in a personal remote storage space of the user 104 without actually sending the electronic content item 234. In these instances, the remote storage service 204 may retrieve the electronic content item 234 (or a copy of the electronic content item 234) from another source or the remote storage service 204 may store a representation of the electronic content item 234 in the personal remote storage space of the user 104. The representation of the electronic content item 234 may include a link to a storage location of the electronic content item 234 in the content provider data store 230.

In a particular implementation, the remote storage module 248 may determine that a particular electronic content item is to be stored in one or more personal remote storage spaces that are not associated with the individual purchasing the particular electronic content item. For example, upon purchasing the electronic content item 234, the user 104 may designate that the electronic content item 234 is to be delivered to the personal remote storage space of another user. In this way, the user 104 can provide the electronic content item 234 to the other user as a gift. In another example, upon purchasing the electronic content item 234, the user 104 may designate a plurality of personal remote storage spaces that are to receive the electronic content item 234. Thus, a teacher or professor can purchase the electronic content item 234 and have the electronic content item 234 provided to personal remote storage spaces of one or more students.

Additionally, the memory 228 includes an item download module 250 that is executable by the processor 226 to send purchased electronic content items 232 to respective client devices. For example, upon purchase of the electronic content item 234 by the user 104 and upon receiving an indication that the electronic content item 234 is to be downloaded by the client device 106, the item download module 250 may send the electronic content item 234 or a copy of the electronic content item 234 to the client device 106.

In some cases, the item download module 250 may determine whether a particular client device is executing a downloader application before sending a purchased electronic content item 232 to the particular client device. To illustrate, the item download module 250 may send a request to the particular client device to determine whether the particular client device is executing a downloader application. Upon receiving an indication that the particular client device is not executing a downloader application, the item download module 250 may send the purchased electronic content item 232 (or a copy thereof) to the particular client device. Alternatively, in response to receiving an indication that the particular client device is executing a downloader application, the item download module 250 may send download information 240 associated with the purchased electronic content item to the client device 106.

In an illustrative implementation, the user 104 may have purchased the electronic content item 234 from the content provider 202 and the item download module 250 may receive an indication from the delivery option module 246 that the electronic content item 234 is to be downloaded to the client device 106. In response to sending a request to the client device 106 to determine whether the client device 106 is executing a downloader application, the item download module 250 may receive an indication from the client device 106 specifying that the client device 106 is executing the downloader application 222. In some cases, item download module 250 may receive the indication from the downloader application 222, while in other situations the item download module 250 may receive the indication from the operating system 224. In response to receiving the indication that the client device 106 is executing the downloader application 222, the item download module 250 may send download information 240 associated with the electronic content item 234 to the client device 106. For example, the item download module 250 may send a content provider URL 242 to the client device 106, where the content provider URL indicates a storage location of the electronic content item 234 in the content provider data store 230. Additionally, the item download module 250 may receive a request for the electronic content item 234 from the client device 104 that includes the content provider URL 242. In response to receiving this request from the client device 106, the item download module 250 may provide the electronic content item 234 to the client device 106.

The remote storage service 204 includes one or more processors indicated by the processor 252. The remote storage service 204 also includes memory 254 that is accessible by the processor 252. The memory 254 is an example of computer readable storage media and may include volatile memory, nonvolatile memory, removable memory, non-removable memory, or a combination thereof. For example, the memory 254 may include, but is not limited to, RAM, ROM, EEPROM, flash memory, one or more hard disks, solid state drives, optical memory (e.g. CD, DVD), or other non-transient memory technologies. The memory 254 may store a number of modules including computer-readable instructions executable by the processor 252 to provide remotely stored electronic content items to users.

The remote storage service 204 also includes a remote storage data store 256 that includes personal remote storage 258 for one or more individuals. In particular, the personal remote storage 258 includes one or more personal remote storage spaces, such as the personal remote storage space 260. The personal remote storage space 260 may be associated with the user 104 and store a variety of data for the user 104, such as the electronic items 234-236, electronic billing statements, personal documents (e.g. word processing documents, spreadsheet documents, etc.), and the like.

The remote storage data store 256 may also store item access information 262 that may be utilized to access electronic content items stored in personal remote storage 258. In particular, the item access information 262 may include identifiers that specify storage locations of electronic content stored in the personal remote storage space 260, such as respective remote storage URLs 264 for the electronic content items 234-236. The remote storage URLs 264 may be unique with respect to a user associated with a personal remote storage space and with respect to each particular electronic content item stored in the personal remote storage space.

The memory 254 includes a content provider module 266 executable by the processor 252 to receive electronic content items from the content provider data store 230 and store the electronic content items in personal remote storage spaces of respective individuals. For example, the content provider module 266 may receive electronic content items 234 and 236 from the content provider data store 230 to store in the personal remote storage space 260 of the user 104. The content provider module 266 may also receive indications from the content provider 202 that electronic content items are to be stored in the personal remote storage 258. In these cases, the content provider module 266 may store a representation of the electronic content items in the personal remote storage 258.

The memory 254 also includes a client operating system (OS) module 268 that is executable by the processor 252 to facilitate interactions between the remote storage service 204 and the client devices served by the remote storage service 204. For example, the client OS module 268 may provide one or more applications to the client device 106 that allow the user 104 to view and manage the electronic content items 234-236 stored in the personal remote storage space 260. To illustrate, the one or more applications provided to the client device 106 from the client OS module 268 may be executable on the client device 106 to display the personal remote storage space 260 as a drive that is accessible to the client device 106, such as a network accessible drive. In addition, the applications provided by the client OS module 268 may be executable to view the contents of the personal remote storage space 260, to consume the electronic content items 234-236, or a combination thereof. The one or more applications provided to the client device 106 are compatible with the type of the operating system 224 executing on the client device 106. In particular, the client OS module 268 may provide applications compatible with a Macintosh® operating system, a Windows® operating system, a Linux® operating system, and the like, based on the type of the operating system 224 executing on the client device 106.

The client OS module 268 may also authenticate other client devices of a user to provide access to electronic content items stored in the personal remote storage 258. In a particular example, the client OS module 268 may authenticate additional client devices of the user 104 to access content of the personal remote storage space 260, such as the electronic content items 234-236. To illustrate, an additional client device of the user 104 may request access to the contents of the personal remote storage space 260. In response, the client OS module 268 may request authentication information from the user 104 corresponding to an account of the user 104 with the remote storage service 204. Upon receiving proper authentication information, the client OS module 268 may send one or more applications to the additional client device of the user 104 that are executable to provide access to the contents of the personal remote storage space 260. The one or more applications provided by the client OS module 268 may utilize the authentication information or an authentication credential provided by the remote storage service 204 to provide access to the contents of the personal remote storage space 260. In this way, the user 104 can utilize multiple client devices to access content stored in the personal remote storage space 260.

The memory 254 also includes a remote download module 270 executable by the processor 252 to receive instructions to send electronic content items stored in the personal remote storage 258 to a particular client device. The remote download module 270 may receive the instruction to download electronic content items to the particular client device from the content provider 202, the particular client device, the media service 206, or a combination thereof. In some cases, the content provider 202 may receive a request from a client device to download a particular electronic content item after the electronic content item has been stored in the remote storage data store 258. In these cases, the remote download module 270 may receive an instruction from the content provider 202 to send the particular electronic content item to the requesting client device. In other cases, the remote download module 270 may receive a request for an electronic content item from a downloader application of a client device. In a particular implementation, the remote download module 270 may receive a request from the downloader application 222 of the client device 106 for the electronic content item 234. Further, the remote download module 270 may receive a request from the media service 206 to download the electronic content item 234 to the client device 106.

In some situations, after receiving an instruction from the content provider 202, the client device 106, the media service 206, or a combination thereof, to download an electronic content item to a particular client device, the remote download module 270 may determine whether the particular client device is executing a downloader application. For example, the remote download module 270 may send a request to the particular client device to determine whether a downloader application is executing on the particular client device. When a downloader application is not executing on the particular client device, the remote download module 270 may send the requested electronic content item to the requesting client device directly or via the media service 206 depending on the entity that sent the request to the remote storage service 204.

When a downloader application is executing on the particular client device, the remote download module 270 may provide item access information 262, such as a respective remote storage URL 264, to the particular client device. Subsequently, the remote download module 270 may receive a request for the electronic content item from the downloader application of the particular client device, where the request includes the respective remote storage URL 264. The remote download module 270 may utilize the remote storage URL 264 to access the requested electronic content item and send the particular electronic content item or a copy of the particular electronic content to the particular client device.

The memory 254 also includes a streaming module 272 that is executable by the processor 252 to receive a request to stream an electronic content item from personal remote storage 258 to a particular client device. In some cases, the request may be received from the particular client device, while in other cases the request may be received from the media service 206. In response to the request to stream the electronic content item, the streaming module 272 may stream the electronic content item to the requesting client device either directly or via the media service 206.

The media service 206 may include one or more components (not shown), such as memory, one or more processors, and so on, to perform a variety of functions, such as stream media 274, upload media 276, download media 278, or a combination thereof. The media service 206 may be a network-accessible media service that is available via a corresponding site. In some cases, the media service 206 may stream or download electronic content items stored in the personal remote storage 258 to a particular client device. The media service 206 may also be utilized to upload electronic content items to the personal remote storage 258 from a particular client device. For example, the user 104 may access a site of the media service 206 and utilize the site to upload image content (e.g. photographs), video content (e.g. personal videos), documents, and the like to the personal remote storage space 260. The media service 206 may also store one or more playlists associated with particular users of the remote storage service 204. In some cases, the media service 206 may create a playlist that includes electronic content items recently purchased from the content provider 202 and saved in the personal remote storage 258.

When the media service 206 receives a request from a client device to stream or download an electronic content item, the media service 206 may send a request for the electronic content item to the remote storage service 204. In some cases, the request may include a remote storage URL 264 associated with the requested electronic content item. The remote storage URL 264 may have been previously obtained by the media service 206 or may have been obtained in response to receiving the request for the electronic content item.

Although the illustrative example of FIG. 2 shows the content provider 202, the remote storage service 204, and the media service 206 as separate components, one or more of the components 202-206 may be included in a particular entity. For example, the content provider 202, the remote storage service 204, and the media service 206 may be provided by a network-based services company. In another example, a content provider 202, such as an online merchant, may utilize the remote storage service 204 and the media service 206 offered by a third-party service provider, such as a network-based services company.

Furthermore, although the description of FIG. 2 discusses a user purchasing electronic media items, the system 200 is not limited to purchasing electronic media items, but can be utilized with respect to any form of individuals acquiring electronic media items. For example, promotional electronic content items may be stored in personal remote storage space via the system 200.

Example User Interfaces

Figure 3:
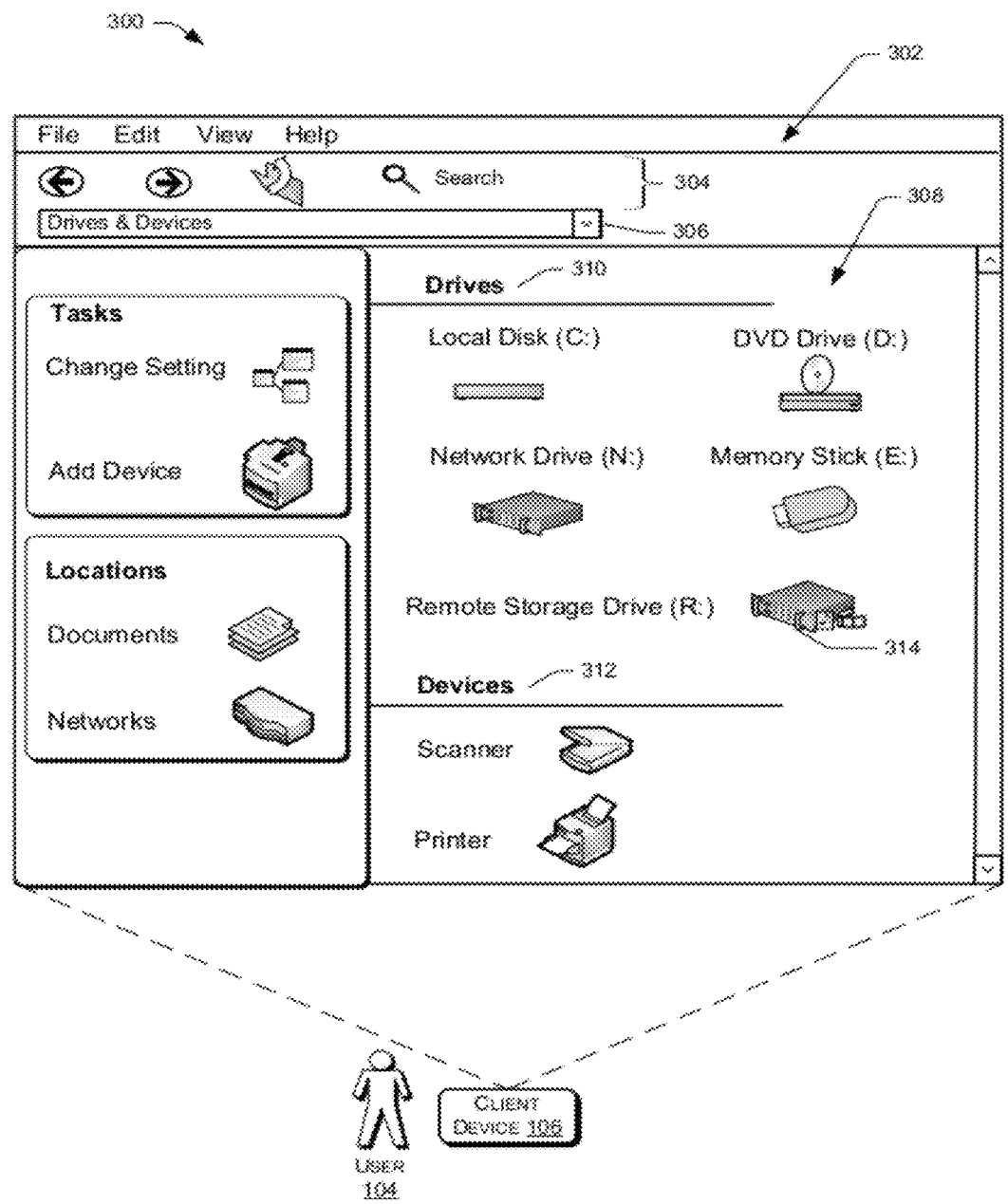
FIG. 3 shows a user interface including a representation of a personal remote storage space as a drive accessible by a client device.

FIG. 3 shows a user interface 300 including a representation of personal remote storage space as a drive accessible by a client device. The graphical user interface 300 may be provided to the user 104 via a display of the client device 106. The graphical user interface 300 may include a menu 302 and a toolbar 304. The toolbar 304 may include a number of icons that are selectable to control the display of components and/or files accessible via the client device 106. The graphical user interface 300 may also include a locator portion 306 that indicates a locator associated with a particular type of components or files that are accessible via the client device 106.

In the illustrative example shown in FIG. 3, the locator 306 indicates that a portion 308 of the graphical user interface 300 shows icons specifying drives 310 and devices 312 that are accessible via the client device 106. In particular, the portion 308 includes an icon 314 indicating that a remote storage drive (R:) is accessible via the client device 106. The remote storage drive (R:) may correspond to the personal remote storage space 260 of FIG. 2. The icon 314 may be generated by the operating system of the client device 106 in conjunction with one or more applications provided by a remote storage service, such as one or more applications provided by the client OS module 268 of FIG. 2.

Figure 4:
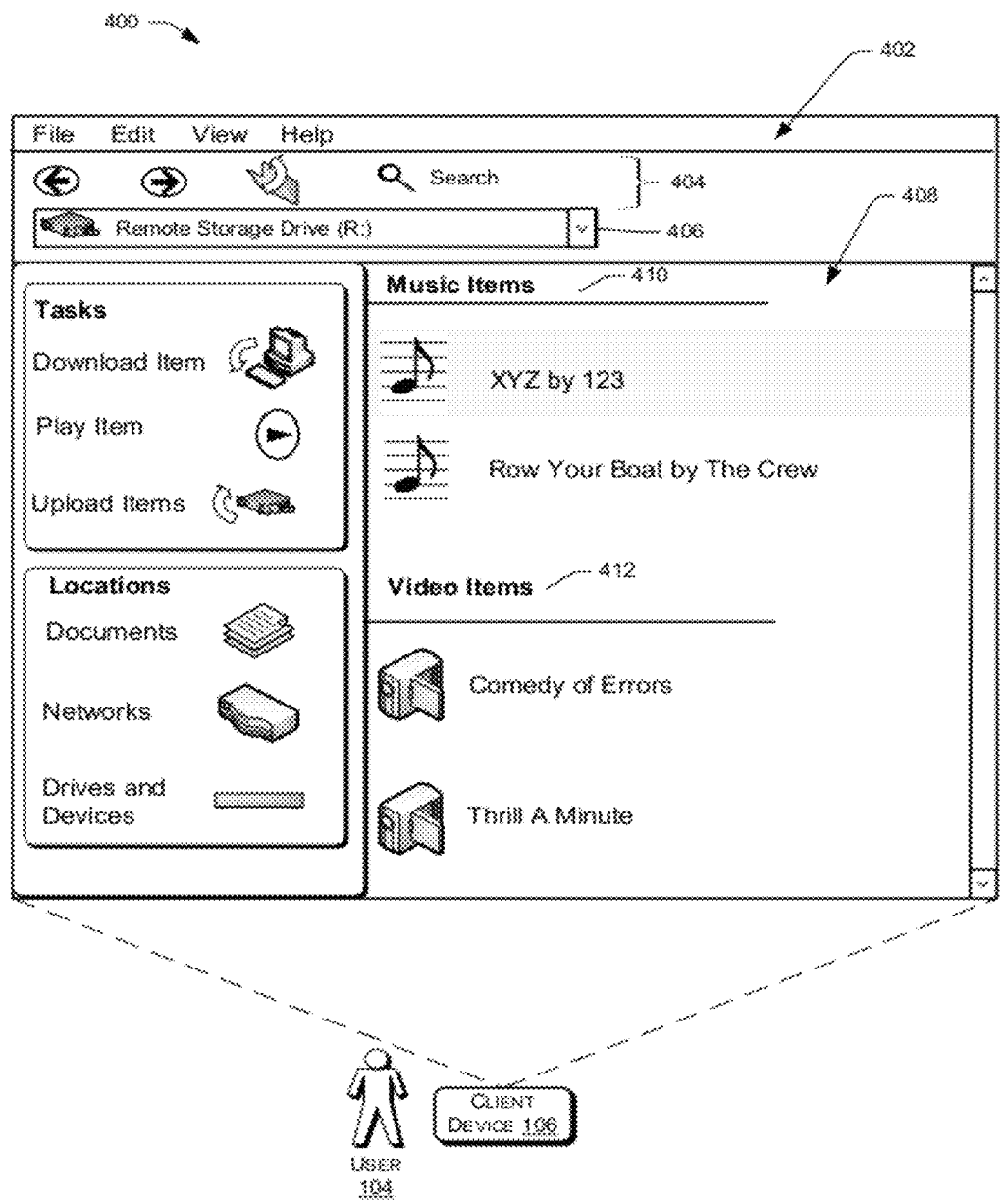
FIG. 4 shows a user interface indicating electronic content items stored in a personal remote storage space.

FIG. 4 shows a graphical user interface 400 indicating electronic content items stored in a personal remote storage space. In some cases, the graphical user interface 400 may be generated by the client device 106 in response to selection of the icon 314 in FIG. 3 corresponding to the remote storage drive (R:). Additionally, the graphical user interface 400 may be generated in conjunction with one or more applications that were received from a remote storage service, such as the one or more applications provided by the client OS module 268 of FIG. 2.

The graphical user interface 400 includes a menu 402, a toolbar 404, and a locator 406 that are similar to the corresponding features of FIG. 3. However, the locator 406 of FIG. 4 indicates that the portion 408 displays content of the remote storage drive (R:). In particular, the portion 408 shows music items 410 and video items 412 stored in the remote storage drive (R:). The music items 410 and the video items 412 may correspond to electronic content items stored in a personal remote storage space, such as the electronic content items 234 and 236 stored in the personal remote storage space 260 of FIG. 2.

Figure 5:
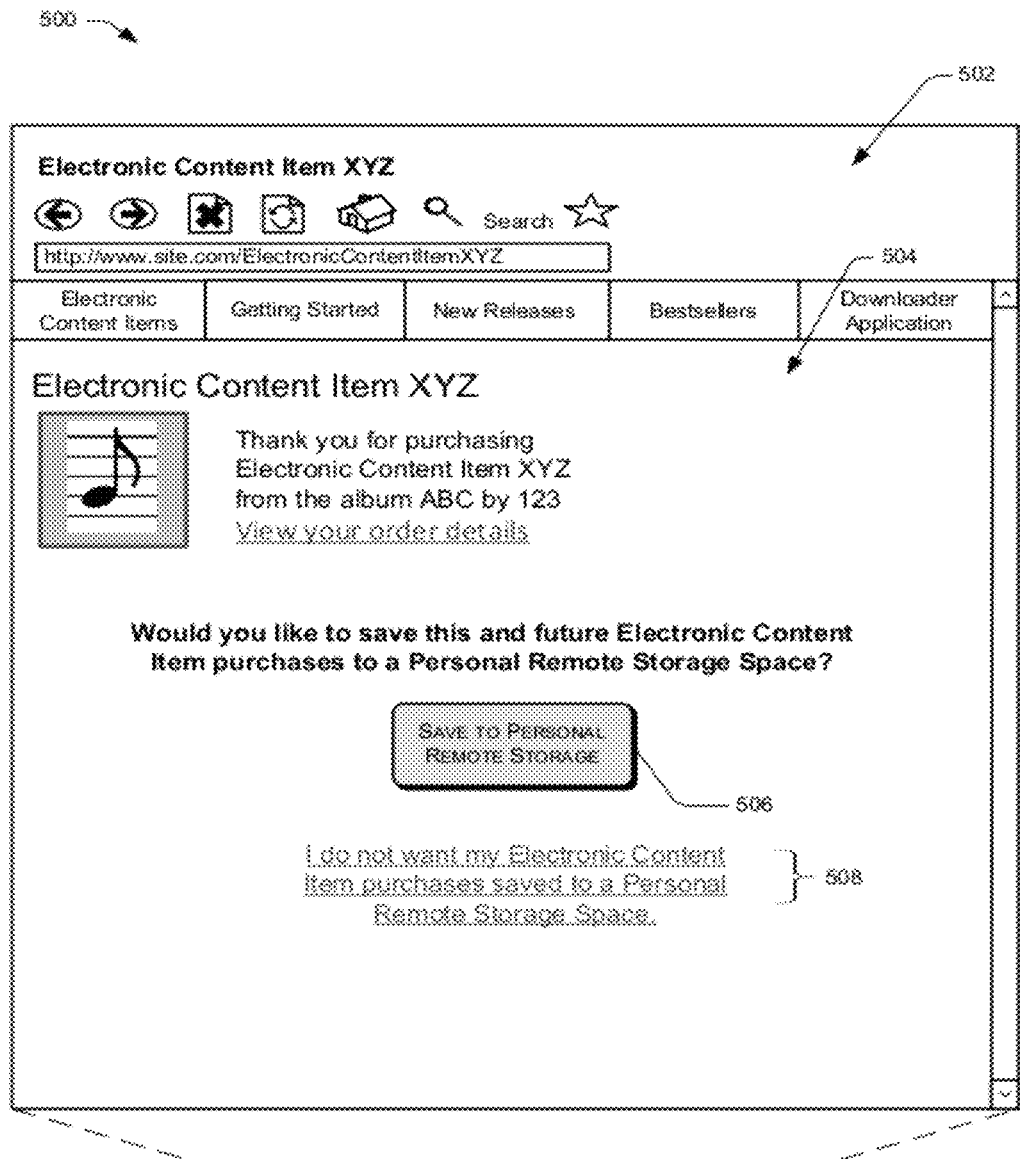
FIG. 5 shows a user interface including an option to store an electronic content item in a personal remote storage space upon acquiring the electronic content item.

FIG. 5 shows a graphical user interface 500 including an option to store an electronic content item in a personal remote storage space upon purchase of the electronic content item. The graphical user interface 500 may be produced by a browser or other suitable application executing on the client device 106. The graphical user interface 500 may be produced in response to the user 104 purchasing the electronic content item XYZ.

The graphical user interface 500 includes a first portion 502 that includes a toolbar and a locator specifying a page of a site that was utilized to purchase the electronic content item XYZ. The graphical user interface 500 also includes a second portion 504 showing the page specified in the locator of the first portion 502. The second portion 504 may constitute a Thank You page or a Confirmation page provided in response to the purchase of the electronic content item XYZ.

The second portion 504 includes an option 506 that is selectable to store the purchased electronic content item XYZ and future electronic item purchases in a personal remote storage space of the user 104. The second portion 504 also includes an option 508 that is selectable to indicate that the user 104 does not want the electronic content item XYZ or other purchases saved to a personal remote storage space of the user 104. In some cases, upon selection of the option 506 or the option 508, a default preference of the user 104 may be set based on the option 506 or 508 that was selected.

Figure 6:
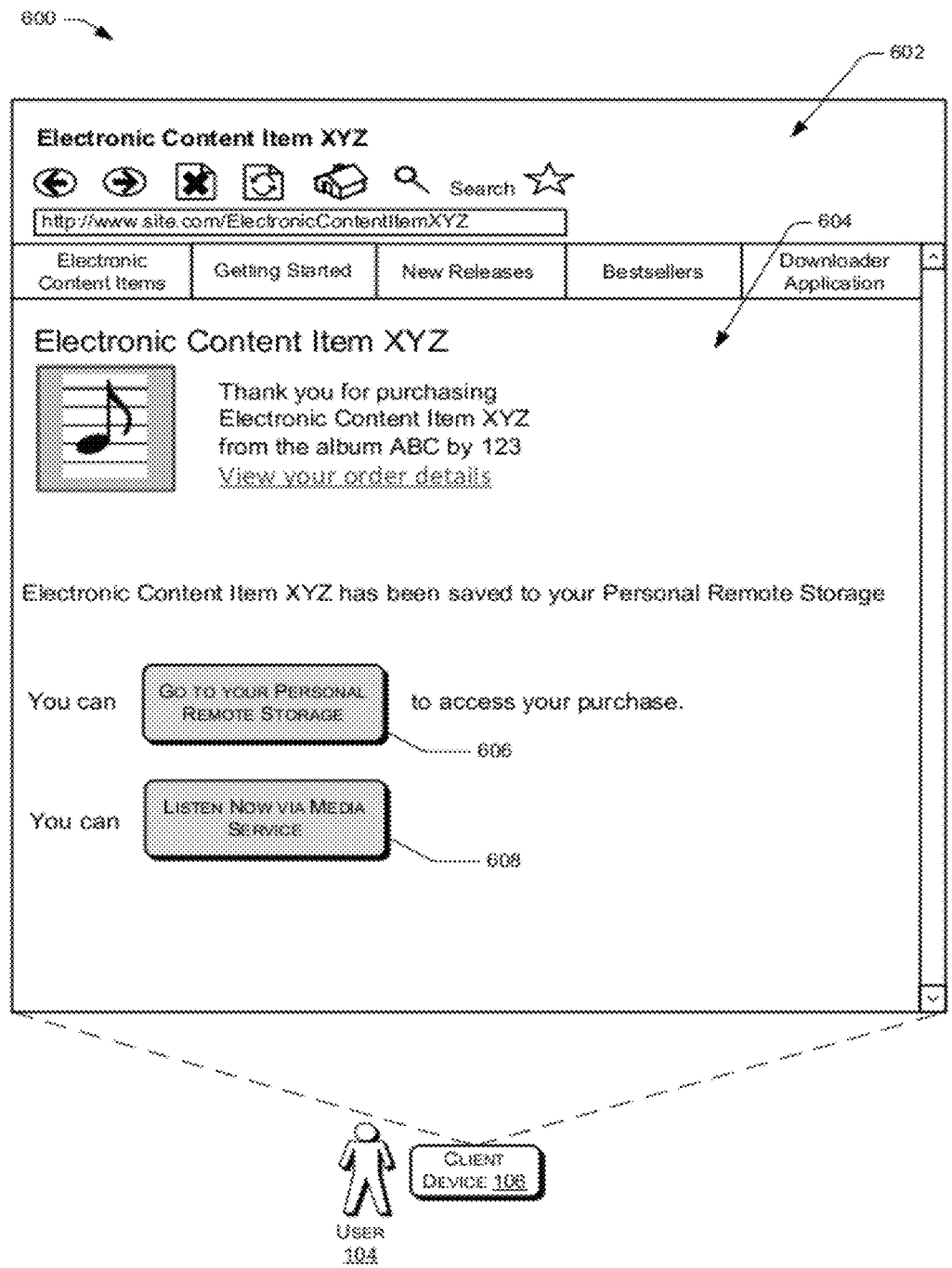
FIG. 6 shows a user interface including an option to access an electronic content item stored in a personal remote storage space and an option to consume the electronic content item via a media service.

FIG. 6 shows a graphical user interface 600 including an option to access an electronic content item stored in a personal remote storage space and an option to consume the electronic content item via a media service. The graphical user interface 600 may be produced by a browser or other suitable application executing on the client device 106. The graphical user interface 600 may be produced in response to the selection of the option 506 in FIG. 5 or in response to determining that a default setting of the user 104 specifies saving electronic content items purchased by the user 104 to a personal remote storage space.

The graphical user interface 600 includes a first portion 602 that includes a toolbar and a locator specifying a page of a site that was utilized to purchase the electronic content item XYZ. The graphical user interface 600 also includes a second portion 604 showing the page specified in the locator of the first portion 602. The second portion 604 indicates that an electronic content item XYZ has been saved to a personal remote storage space of the user 104. In addition, the second portion 604 includes an option 606 that is selectable to view the contents of the personal remote storage space of the user 104. For example, selection of the option 606 may result in the display of a graphical user interface similar to the graphical user interface 400 of FIG. 4 that shows electronic content items stored in the personal remote storage space of the user 104.

The second portion 604 also includes an option 608 that is selectable to consume (i.e. listen to) the electronic content item XYZ. In particular, selection of the option 608 may launch a network-based media service, such as the media service 206 of FIG. 2, to play the electronic content item XYZ. In some implementations, selection of the option 608 may result in the display of a page of a media service site via the client device 106. The page of the media service site may include one or more playlists of the user 104 that include the electronic content item XYZ. In some cases, a playlist of recently purchased electronic content items may be provided with the recently purchased electronic content items preselected, such that selection of a Play option by the user 104 results in playing the recently purchased electronic media items.

Illustrative Processes

FIGS. 7-10 show processes 700-1000 respectively, to provide personal remote storage of electronic content items acquired by a user of a client device. The processes 700-1000 are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Figure 7:
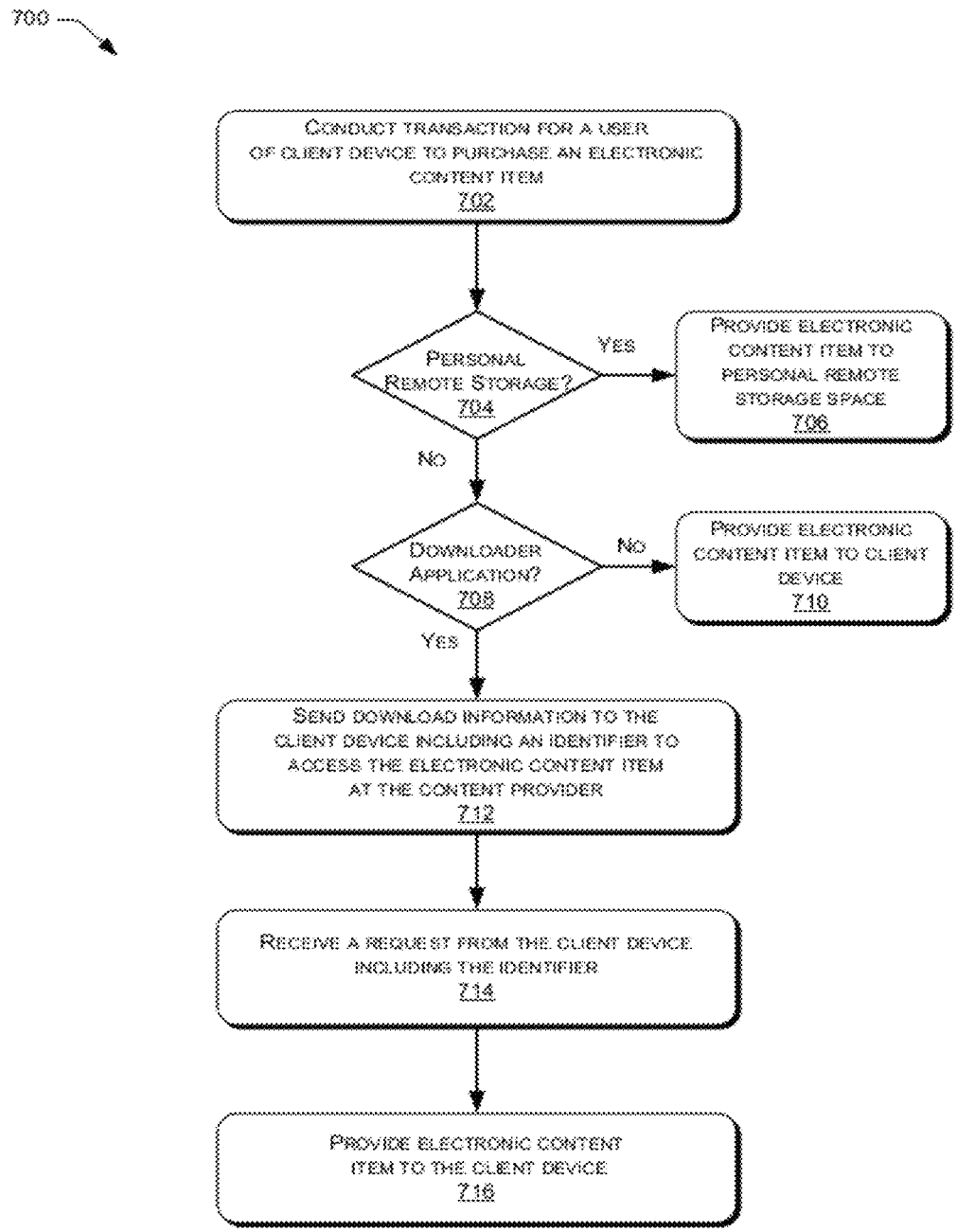
FIG. 7 is a flow diagram of a process to provide an electronic content item to a personal remote storage space from a content provider data store or to provide the electronic content item directly to the client device from the content provider data store.

FIG. 7 is a flow diagram of a process 700 to provide an electronic content item to a personal remote storage space from a content provider data store or to provide the electronic content item directly to the client device from the content provider data store. At 702, a transaction is conducted for a user of a client device to acquire an electronic content item. For example, the user may access a site of a content provider or a merchant to purchase the electronic content item and initiate an online transaction to purchase the electronic content item.

At 704, the process 700 includes determining whether the electronic content item is to be stored in a personal remote storage space of the user. In some scenarios, preferences included in an account of the user with the content provider or the merchant may be parsed to determine whether the user has indicated that electronic content items acquired by the user are to be stored in a personal remote storage space. In other instances, a server of the content provider or merchant may determine whether an option has been selected by the user specifying that the electronic content item is to be stored in a personal remote storage space. In some cases, the option may have been provided to the user during a transaction to purchase the electronic content item. For example, the option may be provided on a page served to the client device confirming the purchase of the electronic content item, such as a Thank You page or a Confirmation page.

When the electronic content item is to be stored in a personal remote storage space of the user, the process 700 moves to 706 where the electronic content item is stored in the personal remote storage space. Otherwise, the process 700 moves to 708 where a server of the content provider or the merchant determines whether a downloader application is executing on the client device. In particular, the server may send a query to the client device to determine whether a downloader application is executing on the client device. When the downloader application is not executing on the client device, the process 700 moves to 710 where the electronic content item is provided to the client device. Otherwise, the process 700 moves to 712.

At 712, the server sends download information to the client device. In particular, the download information may be directed to the downloader application of the client device. The download information includes an identifier, such as a content provider URL, to access the electronic content item. For example, the identifier may specify a storage location of the electronic content item at a data store of the content provider or the merchant. At 714, the server receives a request from the client device for the electronic content item. The request may be received from the downloader application of the client device and may include at least a portion of the download information, such as the identifier. At 716, the server utilizes the identifier to provide the electronic content item to the client device.

Figure 8:
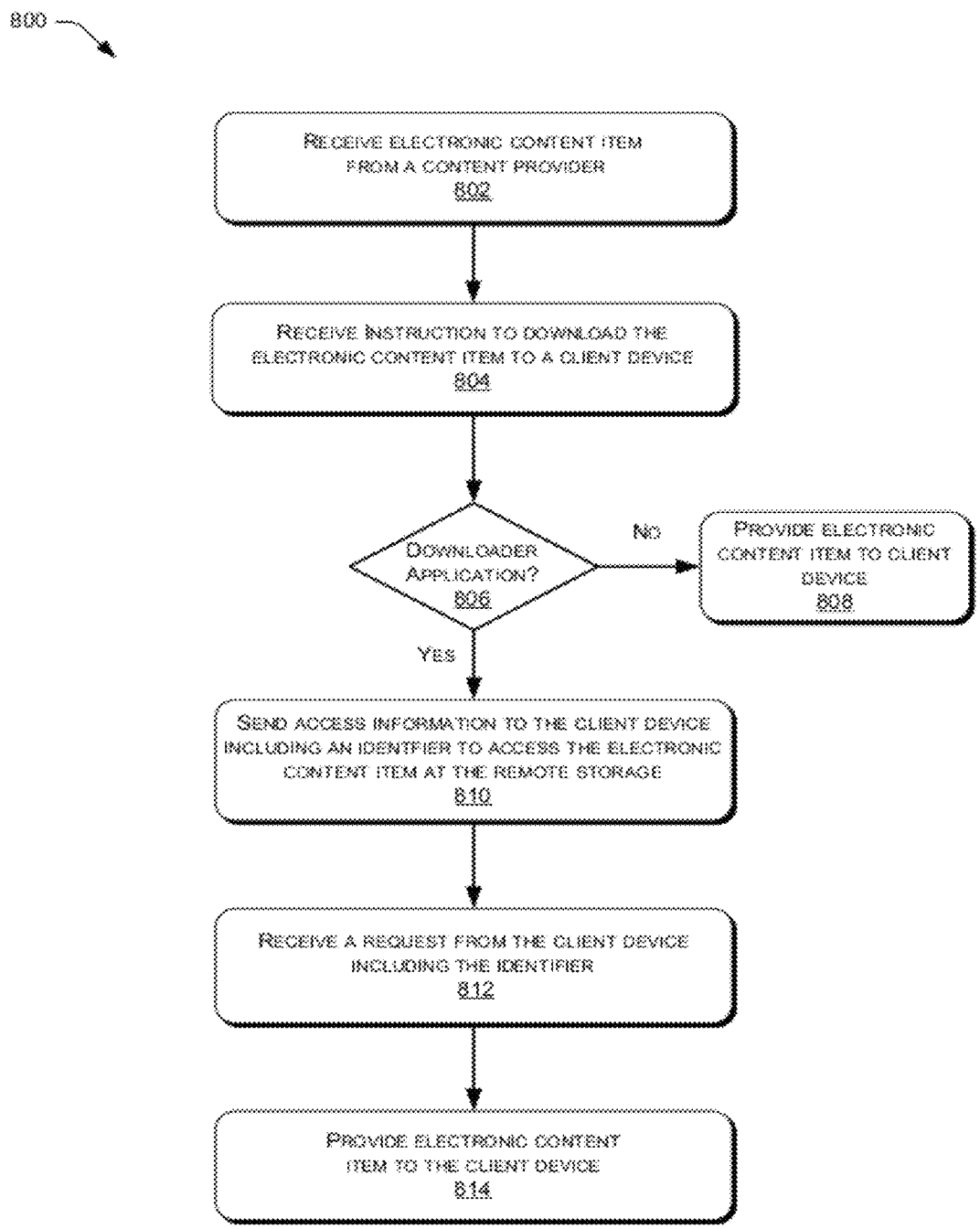
FIG. 8 is a flow diagram of a process to store an electronic content item in a personal remote storage space and provide the electronic content item to a client device from the personal remote storage space directly or via a downloader application.

FIG. 8 is a flow diagram of a process 800 to store an electronic content item in a personal remote storage space and provide the electronic content item to a client device from the personal remote storage space directly or via a downloader application. At 802, the process 800 includes a remote storage service receiving an electronic content item from a content provider. To illustrate, upon the acquisition of the electronic content item from a content provider or a merchant, the electronic content item may be sent to a personal remote storage space of a user of a client device. In some cases, the user may have specified that the purchase of the electronic content item is to be stored in the personal remote storage space. The personal remote storage space may be provided by a remote storage service that may be operated by the content provider, the merchant, or a third-party service provider.

At 804, the remote storage service receives an instruction to send the electronic content item to the client device of the user. In a particular implementation, after a content provider or merchant determines that the electronic content item is to be stored in a personal remote storage space, a page may be served to the client device that includes an option to download the electronic content item. In this implementation, when the content provider or merchant receives an indication that the user has selected the option to download the electronic content item, the content provider or merchant can send the instruction to the remote storage service to provide the electronic content item to the client device from the personal remote storage space. In other implementations, the remote storage service may receive an instruction directly from the client device or from a media service to provide the electronic content item to the client device.

At 806, the process 800 includes determining whether the client device is executing a downloader application. When the client device is not executing the downloader application, the process 800 moves to 808 where the remote storage service provides the electronic content item to the client device. Otherwise, the process 800 moves to 810 where the remote storage service sends access information to the client device. In particular, the access information may be directed to the downloader application of the client device. The access information may include an identifier, such as a remote storage URL, indicating a storage location of the electronic content item in the remote personal storage space of the user of the client device.

At 812, the remote storage service receives a request from the client device to download the electronic content item. The request may be received from the downloader application of the client device and may include at least a portion of the access information, such as the identifier. At 814, the remote storage service utilizes the identifier to provide the electronic content item to the client device from the personal remote storage space of the individual.

Figure 9:
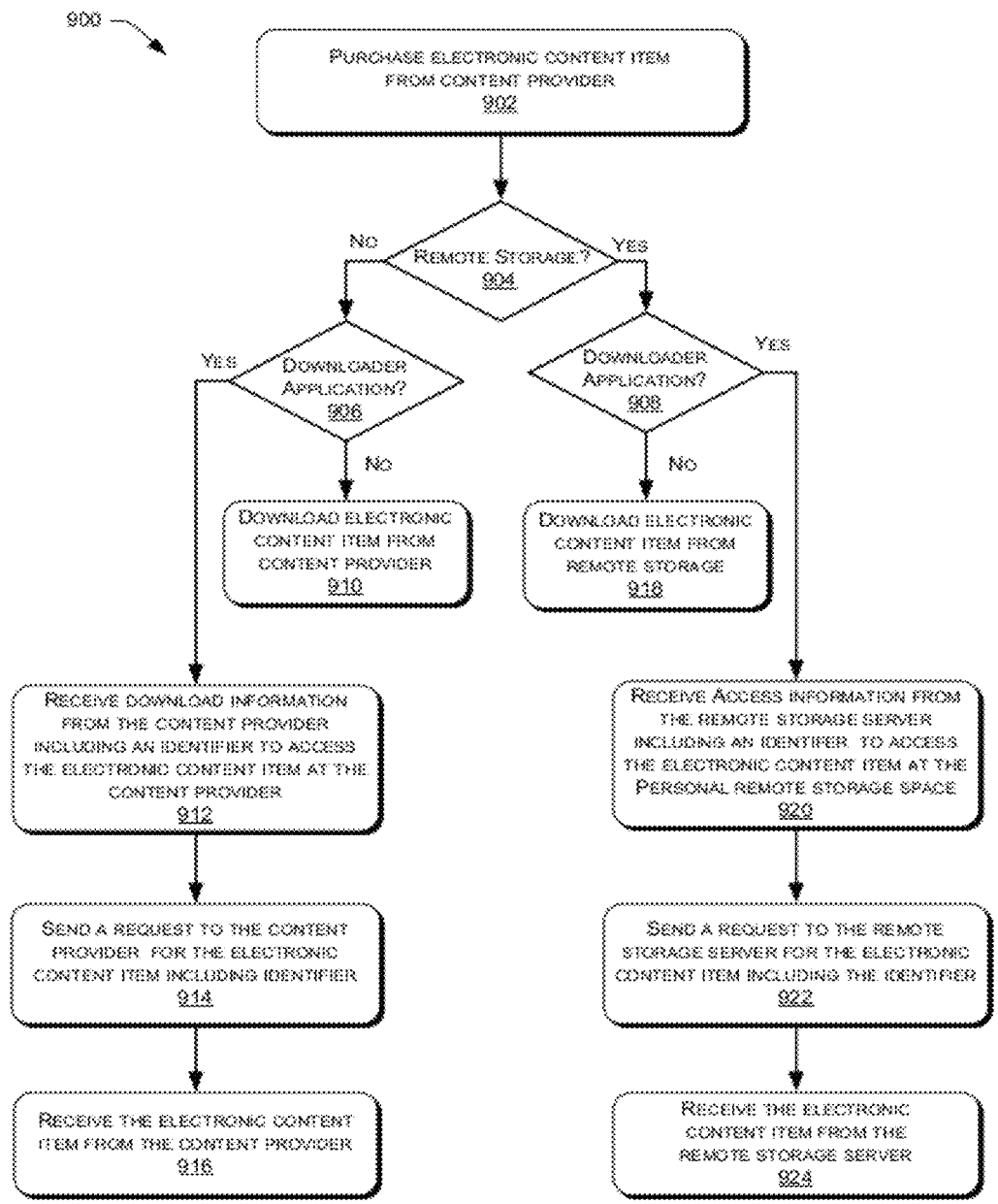
FIG. 9 is a flow diagram of a process to obtain an electronic content item acquired by a user of a client device from a content provider data store or from a personal remote storage space.

FIG. 9 is a flow diagram of a process 900 to obtain an electronic content item acquired by a user of a client device from a content provider data store or from a personal remote storage space. At 902, a client device may participate in a transaction to acquire an electronic content item from a content provider. At 904, the client device determines whether the electronic content item has been stored in a personal remote storage space of the user of the client device. For example, the client device may receive an indication from a content provider or remote storage service that the electronic content item has been stored in the personal remote storage space. In another example, the client device may receive an indication that the user of the client device has selected an option to save the electronic content item in the personal remote storage space.

When the electronic content item is not stored in the personal remote storage space, the process 900 advances to 906 and when the electronic content item is to be stored in the personal remote storage space, the process 900 moves to 908. At 906, the client device determines whether the client device is executing a downloader application. The downloader application may be obtained by the client device from a content provider or a remote storage service to facilitate the downloading of electronic content items from the content provider and/or the remote storage service.

When the client device is not executing the downloader application, the process 900 moves to 910 where the electronic content item is downloaded from the content provider. Otherwise, the process 900 moves to 912. At 912, the client device receives download information from the content provider via the downloader application. The download information may include an identifier, such as a content provider URL, to access the electronic content item at the content provider. For example, the content provider URL may indicate a storage location of the electronic content item at a content provider data store. At 914, the client device sends a request to the content provider for the electronic content item, where the request includes the identifier. At 916, the client device receives the electronic content item from the content provider.

As mentioned above, when an electronic content item is to be stored in a personal remote storage space, the process 900 moves from 904 to 908. At 908, the client device determines if the client device is executing a downloader application. When the client device is not executing the downloader application, the process 900 moves to 918 where the client device downloads the electronic content item from a personal remote storage space. Otherwise the process 900 moves to 920. At 920, the client device receives access information from the remote storage server via the downloader application. The access information may include an identifier, such as a remote storage URL, to access the electronic content item at the personal remote storage space. The remote storage URL may indicate a storage location of the electronic content item in the personal remote storage space.

At 922, the client device sends a request to the remote storage server for the electronic content item, where the request includes the identifier. At 924, the client device receives the electronic content item from the personal remote storage space via the remote storage server.

Figure 10:
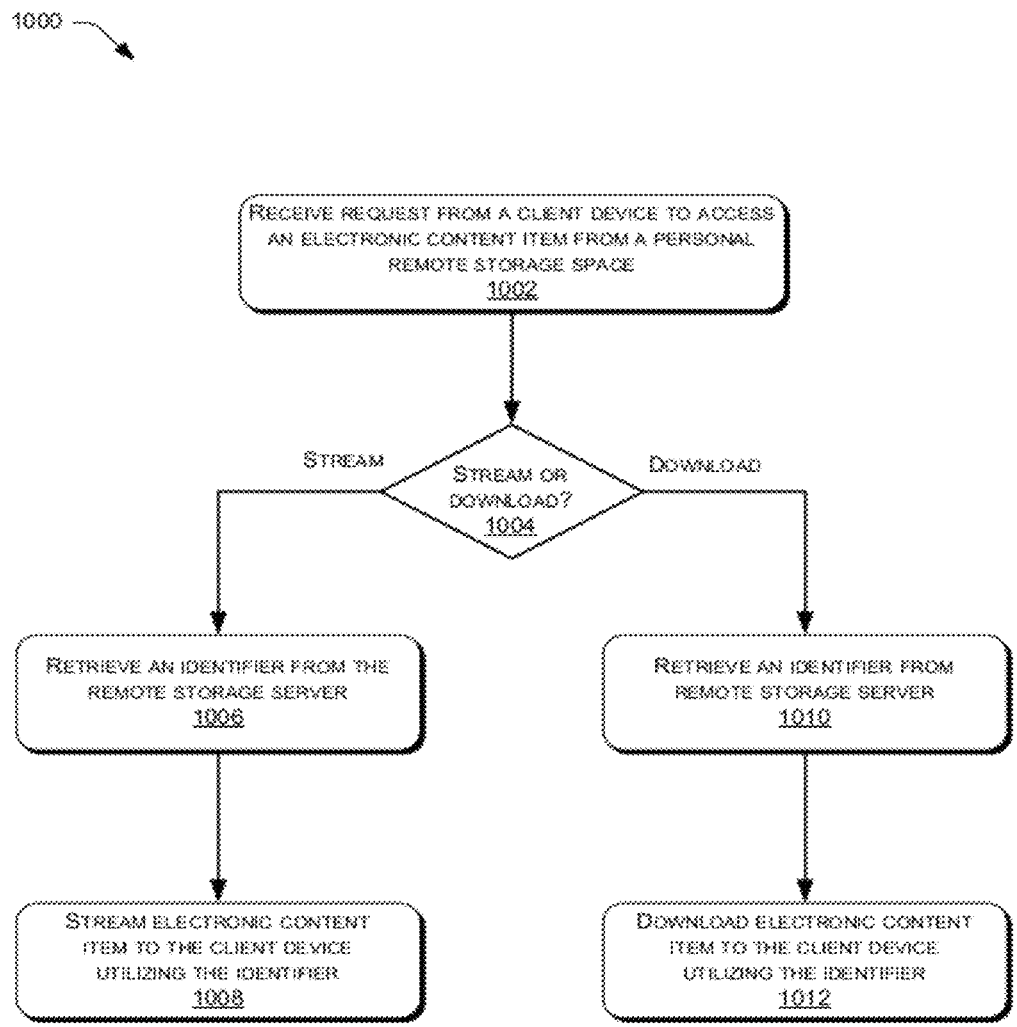
FIG. 10 is a flow diagram of a process to stream an electronic content item to a client device from a personal remote storage space or to download an electronic content item to the client device from the personal remote storage space.

FIG. 10 is a flow diagram of a process 1000 to stream an electronic content item to a client device from a personal remote storage space or to download an electronic content item to the client device from the personal remote storage space. At 1002, a media service receives a request from a client device to access an electronic content item from a personal remote storage space of a user of the client device. At 1004, the media service determines whether the request is to stream the electronic content item to the client device or to download the electronic content item to the client device.

When the request is to stream the electronic content item, the process 1000 moves to 1006. At 1006, the media service retrieves an identifier, such as a remote storage URL, from a remote storage server that manages access to the personal remote storage space. The identifier may be provided to the media service from the remote storage server in response to a request for the identifier by the media service. In addition, the identifier may indicate a storage location of the electronic content item in the personal remote storage space. At 1008, the media service utilizes the identifier to stream the electronic content item to the client device.

When the request from the client device is to download the electronic content item, the process 1000 moves from 1004 to 1010. At 1010, the media service retrieves the identifier from the remote storage server and at 1012, the media service utilizes the identifier to download the electronic content item to the client device from the personal remote storage space.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
    conducting a transaction with a user of a client device requesting to acquire an electronic content item;
    determining, by one or more processors, that the electronic content item is to be stored in a personal remote storage space associated with the user;
    storing the electronic content item in the personal remote storage space in response to the determining that the electronic content item is to be stored in the personal remote storage space;
    receiving, by the one or more processors, an instruction to send the electronic content item to the client device;
    determining that the client device is executing a downloader application in response to receiving the instruction;
    retrieving, by the one or more processors, access information from the personal remote storage space, the access information including an identifier indicating a storage location of the electronic content item in the personal remote storage space;
    sending the access information to the client device when the client device is executing the downloader application;
    receiving, by the one or more processors, a request from the downloader application of the client device for the electronic content item, the request including the identifier; and
    providing the electronic content item to the client device at least partly in response to receiving the request.

2. The computer-implemented method of claim 1, wherein the determining that the electronic content item is to be stored in the personal remote storage space includes receiving an indication that the user has selected an option to store electronic content items purchased from the content provider at the personal remote storage space.

3. The computer-implemented method of claim 2, wherein the option is provided to the user during the transaction to acquire the electronic content item.

4. The computer-implemented method of claim 2, wherein the option is provided on a page served to the client device confirming the acquisition of the electronic content item.

5. The computer-implemented method of claim 1, wherein the determining that the electronic content item is to be stored in the personal remote storage space includes accessing preferences of the user included in an account of the user with the content provider.

6. The computer-implemented method of claim 1, further comprising sending, by the one or more processors, the electronic content item to the client device when the client device is not executing the downloader application.

7. The computer-implemented method of claim 6, further comprising receiving, by the one or more processors, a request from the client device to install the downloader application on the client device.

8. The computer-implemented method of claim 1, wherein a copy of the electronic content item is sent to individual ones of a plurality of remote personal storage spaces.

9. The computer-implemented method of claim 8, wherein individual ones of the plurality of remote personal storage spaces are associated with different users.

10. The computer-implemented method of claim 1, wherein the electronic content item includes video content, image content, audio content, software content, game content, or a combination thereof.

11. A computing system comprising:
    a remote storage data store including personal remote storage space for one or more users;
    a processor; and
    memory accessible by the processor, the memory storing:
    a content provider module comprising computer executable instructions which when executed by the processor perform the operations of:

receiving an electronic content item from a content provider data store in response to a determination that the electronic content item is to be stored in a respective personal remote storage space associated with a particular user, wherein the determination is based at least in part on an account preference of the particular user and occurs during a transaction to acquire the electronic content item; and storing the electronic content item in the respective personal remote storage space; and an item download module comprising computer executable instructions which when executed by the processor perform the operations of:

receiving an instruction to send the electronic content item to a client device associated with the particular user; determining whether the client device is executing a downloader application;

retrieving an identifier from the remote storage data store, the identifier indicating a storage location of the electronic content item in the respective personal remote storage space, the identifier unique to the particular user;

sending the identifier to the downloader application of the client device in response to the client device executing the downloader application;

receiving a request from the client device to download the electronic content item, the request including the identifier; and providing the electronic content item to the client device from the respective personal remote storage space in response to receiving the request.

12. The computing system of claim 11, wherein the instruction to send the electronic content item to the client device is received from the downloader application of the client device, a content provider server, or a media service.

13. The computing system of claim 11, wherein the memory further stores a streaming module comprising computer executable instructions which when executed by the processor perform the operations of:

receiving a request to stream the electronic content item; and streaming the electronic content item to the client device via a media service.

14. The computing system of claim 11, wherein the electronic content item was purchased by the particular user from a site of a merchant.

15. The computing system of claim 11, wherein receiving the electronic content item from the content provider data store indicates selection of an option to store electronic content items acquired by the particular user in the respective personal remote storage space.

16. The computing system of claim 15, wherein the selection of the option sets a default preference of the particular user to automatically store the electronic content items acquired by the particular user in the respective personal remote storage space.

17. A client device comprising:
a processor; and
memory accessible by the processor, the memory storing:
a first application comprising computer executable instructions which when executed by the processor perform the operations of:
accessing a site of a content provider; and
acquiring an electronic content item from the content provider via the site; and
a second application comprising computer executable instructions which when executed by the processor perform the operations of:
receiving access information from a remote storage server after the electronic content item has been acquired;
sending a request to the remote storage server to obtain the electronic content item from a personal remote storage space associated with a user of the client device, the request including at least a portion of the access information specific to the user of the client device and indicating a storage location of the electronic content item in the personal remote storage space; and
receiving the electronic content item from the personal remote storage space.

18. The client device of claim 17, wherein the second application is a downloader application comprising computer executable instructions which when executed by the processor further perform the operation of: sending a request to download an additional electronic content item from the content provider.

19. The client device of claim 17, wherein the second application is a downloader application comprising computer executable instructions which when executed by the processor further perform the operations of: storing the electronic content item in the memory and launching a media player application of the client device to play the electronic content item stored in the memory.

20. The client device of claim 17, wherein the second application is a downloader application comprising computer executable instructions which when executed by the processor further perform the operation of: sending a request to a media service to stream the electronic content item from the personal remote storage space.

21. The client device of claim 17, further comprising an operating system comprising computer executable instructions which when executed by the processor perform the operations of:

receiving a request from the remote storage server to provide an indication whether the second application is executing on the client device; and sending an indication to the remote storage server that the second application is executing on the client device.

22. The client device of claim 17, wherein the access information includes a remote storage uniform resource locator (URL), the remote storage URL indicating the storage location of the electronic content item in the personal remote storage space of the client device.

* * * * *